(12) United States Patent
Lee et al.

(10) Patent No.: US 7,116,825 B2
(45) Date of Patent: Oct. 3, 2006

(54) MULTILEVEL CHAIN-AND-TREE MODEL FOR IMAGE-BASED DECISIONS

(76) Inventors: Shih-Jong J. Lee, 15418 SE. 53rd Pl., Bellevue, WA (US) 98006; Chi-Chou Huang, 9610 179th Pl. NE. #2, Bellevue, WA (US) 98052

( * ) Notice: Subject to any disclaimer, the term of this patent is extended or adjusted under 35 U.S.C. 154(b) by 692 days.

(21) Appl. No.: 10/104,669

(22) Filed: Mar. 22, 2002

(65) Prior Publication Data
US 2003/0179936 A1    Sep. 25, 2003

(51) Int. Cl.
G06K 9/68    (2006.01)
(52) U.S. Cl. ............ 382/226; 382/156; 382/160; 382/209; 706/12; 706/20; 706/46
(58) Field of Classification Search .......... 382/226, 382/227, 160, 156, 209; 706/12, 20, 46
See application file for complete search history.

(56) References Cited

U.S. PATENT DOCUMENTS

| | | | | |
|---|---|---|---|---|
| 5,289,373 A * | 2/1994 | Zarge et al. | ............... | 600/434 |
| 5,325,445 A * | 6/1994 | Herbert | ............... | 382/225 |
| 5,850,469 A * | 12/1998 | Martin et al. | ............... | 382/154 |
| 5,905,507 A * | 5/1999 | Rossignac et al. | ........... | 345/440 |
| 6,026,189 A * | 2/2000 | Greenspan | ............... | 382/226 |
| 6,173,066 B1 * | 1/2001 | Peurach et al. | ........... | 382/103 |
| 6,324,299 B1 * | 11/2001 | Sarachik et al. | ........... | 382/151 |
| 6,324,532 B1 * | 11/2001 | Spence et al. | ........... | 706/27 |
| 6,330,354 B1 * | 12/2001 | Companion et al. | ........ | 382/150 |
| 6,453,452 B1 * | 9/2002 | Chang et al. | ............... | 716/8 |
| 6,546,308 B1 * | 4/2003 | Takagi et al. | ............... | 700/121 |
| 6,563,324 B1 * | 5/2003 | Nichani | ............... | 324/537 |
| 6,594,623 B1 * | 7/2003 | Wang et al. | ............... | 703/1 |
| 6,681,039 B1 * | 1/2004 | Roberts et al. | ........... | 382/151 |
| 6,690,841 B1 * | 2/2004 | Nguyen et al. | ........... | 382/294 |
| 6,714,679 B1 * | 3/2004 | Scola et al. | ............... | 382/199 |
| 6,754,675 B1 * | 6/2004 | Abdel-Mottaleb et al. | ......... | 707/104.1 |
| 6,826,443 B1 * | 11/2004 | Makinen | ............... | 700/121 |
| 6,910,001 B1 * | 6/2005 | Hammersley et al. | ......... | 703/2 |
| 7,016,885 B1 * | 3/2006 | Mikhael et al. | ........... | 706/20 |
| 7,016,887 B1 * | 3/2006 | Stockfisch | ............... | 706/45 |
| 7,031,948 B1 * | 4/2006 | Lee | ............... | 706/14 |

OTHER PUBLICATIONS

P.F. Felzenszwalb and D.P. Huttenlocher, "Efficient Matching of Pictorial Structures", DARPA contract DAAL01-97-K-0104, CVPR 2000.
P.F. Felzenszwalb, "Object Recognition with Pictorial Structures", Masters Thesis, May 7, 2001.
P.F. Felzenszwalb, "Learning Models for Object Recognition", May 7, 2001.
P.F. Felzenszwalb and D P. Huttenlocher, "Efficiently Computing a Good Segmentation", CVPR, 1998.
Silver, B, "Geometric Pattern Matching for Gneral-Purpose Inspection in Industrial Machine Vision", Intelligent Vision '99 Conference—Jun. 28-29, 1999.
Hanks, J, "Basic Functions Ease Entry Into Machine Vision", Test & Measurement World, Mar. 1, 2000.
Titus, J, "Software makes machine vision easier", Test & Measurement World, Oct. 15, 2001.

* cited by examiner

*Primary Examiner*—Gregory Desire (57) ABSTRACT

A multilevel Chain-And-Tree model provides a framework for an image based decision system. The decision system enables separation of effects of defects within one component from other components within a common subject. The framework provides for linking of structure constraints of components of a common subject and for checking and resolving their consistency. The framework allows discrimination between subtle image changes and natural variations of the subject. The framework for standard data representation facilitates production process control.

11 Claims, 6 Drawing Sheets

MULTILEVEL CHAIN-AND-TREE MODEL FOR IMAGE-BASED DECISIONS

TECHNICAL FIELD

This invention relates to a framework for processing and extracting information in an image based decision system.

BACKGROUND OF THE INVENTION

An image-based decision system processes and extracts information from an image or multiple images to make decisions such as the presence of objects of interest, disease, defects; or the acceptance of measurement parameters such as dimensions, intensity, structures, color, relative position and motion, etc. Image-based decision systems have broad applications such as machine vision, non-contact gauging, inspection, robot guidance, medical imaging, etc.

Many image-based decision tasks involve the detection of defects or gauging of dimensions from man-made manufacturing components, parts or systems. Template matching, golden template comparison and caliper based edge detection are the primary prior art approaches for performing simple machine vision inspection and measurement tasks (Silver, B, "Geometric Pattern Matching for General-Purpose Inspection in Industrial Machine Vision", Intelligent Vision '99 Conference—Jun. 28–29, 1999).

There is often a teaching phase and an application phase for an image-based decision system. In the prior art approach, template region(s) or a golden template is selected by a human and stored in the system in the teaching phase. In addition, edge detection calipers are specified at image regions of interest for edge detection through multiple one-dimensional projection and simple differentiation. In the application phase, a template search is applied to locate the template region(s) in the input image. The located template locations are used to establish a reference coordinate system and/or for deriving points and structures for measurements. Edges are detected from each caliper regions and/or a golden template is subtracted from the normalized input image for defect detection or dimensional measurements (Hanks, J, "Basic Functions Ease Entry Into Machine Vision", *Test & Measurement World*, Mar. 1, 2000; Titus, J, "Software makes machine vision easier", *Test & Measurement World*, Oct. 15, 2001)

There are many long-standing difficulties with the prior-art approach.

1. The prior art teaching process requires human selection of template region(s) and the selection and specification of edge calipers and thresholds for measurements. It is mostly performed in an ad-hoc fashion that often requires experienced personnel and an extensive trial-and-error process. The effectiveness of the resulting inspection process is highly dependent on the experience level of the person who sets up the process. This is inconsistent, expensive, and manual (i.e. not automatic).
2. The prior art approach is intended for simple inspection tasks that check simple measurement results against a pre-defined tolerance for a Pass/Fail decision. The measurements are designed according to the convenience of the machine vision system. They often lack physical meaning and do not usually smoothly correlate to physical changes. Therefore, they may only be able to detect gross defects and will have difficulty discriminating between subtle changes and natural variations. For example, a hole measurement algorithm may incorrectly reject a hole due to tilt of the object (for example, caused by a component staging variation) being measured even though the hole is correctly manufactured. Algorithms could be developed to check the tilt angle and other factors before making the hole measurement. However, there may be cases that an incorrectly manufactured hole is mistakenly accepted as a good hole in a tilted object even though the object is not tilted. The creation of a robust algorithm that compensates for different factors requires advanced knowledge, experience and the resulting algorithm could be rather complicated and difficult to test. Some prior-art approaches provide pre-packaged solutions for high volume and well-defined applications to ease this difficulty. However, the pre-packaged approach lacks the flexibility to optimize and adjust configuration and process for many applications.
3. In objects with many components, there is no systematic way of separating variation effects of each component. Therefore, in order to accommodate components with large variations, defects in components with small variations may be missed. Conversely, in order to detect defects in components with small variations, false alarms may be detected from components with large variations.
4. In objects with many components, there is no systematic way of separating effects of each component. Therefore, a defective component in an object may hinder the ability of the inspection system to properly inspect the other components of the object that may also be defective.
5. There is no systematic way of linking structure constraints of components of a common object and check and resolve their consistency. For example, a line on component 1 is designed to be parallel to a line on component 2. When a 10 degree rotation is detected in line component 1, line component 2 is assumed to be rotated by 10 degrees as well. If the measured rotation angle of line component 2 does not match that of line component 1, a method of conflict resolution and estimate refinement should be provided. This is not included in the prior art framework. Special application dependent ad-hoc approach is sometimes used in prior art if the structure linkage is desirable.
6. There is a wealth of design and structure information that are inherently available in manufactured parts. As the quality and precision requirement in manufacturing becomes increasingly important, inspection data becomes a critical resource for production process control. The prior art inspection process only acquires the specific data that are explicity taught into the inspection system. These data are often rather limited. Furthermore, the acquired data are stored in an ad-hoc fashion. There is no standard format and structure of the data. This shortcoming significantly limits the usefulness of machine vision data for statistical process control, process trend and failure analysis and increases the difficulty for users.
7. Prior art approaches cannot be easily generalized to three-dimensional inspection with flexible viewing distance and angles such as parts without fixtures.

Objects and Advantages

An object of this invention is to provide an original framework that will fundamentally resolve the prior art difficulties listed in the Background section. The objectives of the multilevel Chain-And-Tree (CAT) model of this invention are:

1. Provide a framework to automatically or semi-automatically teach a specific application to an image-based decision system.
2. Provide framework discrimination between subtle changes and natural variations.
3. Provide a framework for separating variation effects of each component.
4. Provide a framework for removing defect effects of one component from other components in a common subject.
5. Provide a framework for linking the structure constraints of the components of a common subject and check and resolve their consistency.
6. Provide a framework and standard data representation to facilitate production process control.
7. Provide a framework that can be easily extended to three or higher dimensional image decisions.

SUMMARY OF THE INVENTION

An image based decision method uses a multilevel Chain-And-Tree (CAT) model to organize and process image information to create a CAT reference model, a CAT processing model, a CAT result model. The models derive from a learning image, inspection specification, CAD information, or application knowledge either automatically or semi-automatically to produce a measurement or pass/fail result output.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 3C shows a CAT representation of the relations of the case in FIG. 3A. In

FIG. 3B and FIG. 3C, each line is represented by a circular node and the parallelism relation is represented by a double arrow line segment connecting two nodes.

In FIG. 3E and FIG. 3F, each circle is represented by a circular node and the concentricity relation is represented by a double arrow line segment connecting two nodes;

DETAILED DESCRIPTION OF THE INVENTION

I. Concept

This invention provides a general framework for an Image-based Decision (ID). The Chain-And-Tree (CAT) model of this invention:

1. provides a framework to automatically or semi-automatically teach a specific application to an image-based decision system;
2. provide a framework for discrimination between subtle changes and natural variations in an image-based decision system;
3. provides a framework for separating variation effects of each component in an image-based decision system;
4. provides a framework for removing defect effects of one component from other component in a common subject;
5. provide a framework for linking the structure constraints of the components of a common subject and to check and resolve their consistency;
6. provides a framework and standard data representation to facilitate production process control;
7. provides a framework that can be easily generalized to three-dimensional or higher dimensional image decisions.

II. Overview

Figure 1:
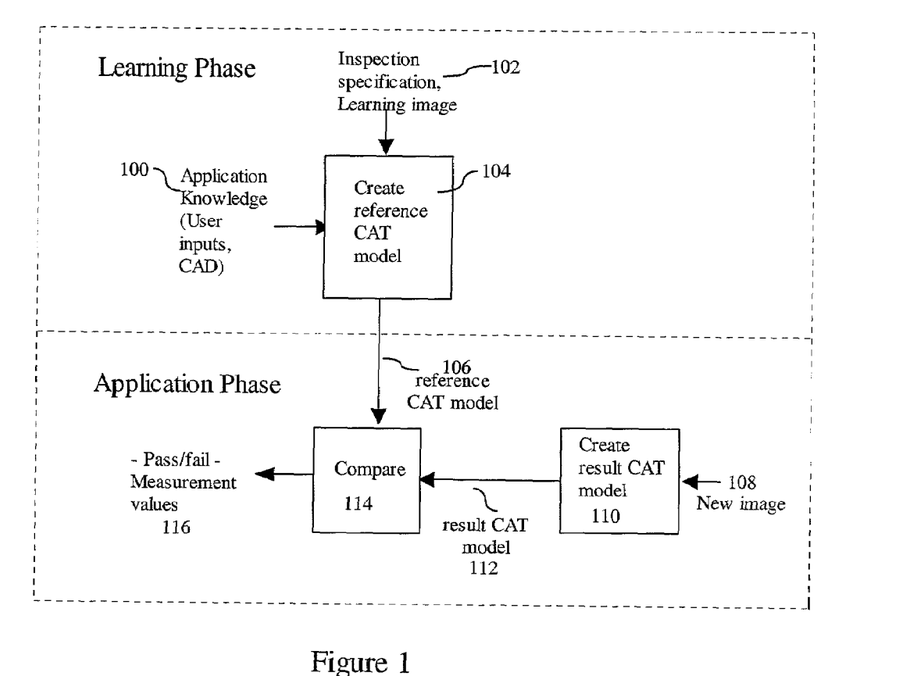
FIG. 1 shows an application scenario of the CAT based ID system.

In a preferred embodiment, the application scenario is shown in FIG. 1. A reference CAT model 106 is created 104 using a reference model basis that includes inspection specification and/or learning image 102 and/or application knowledge 100 during the learning phase. The inspection specification 102 specifies the desired features for inspection and/or measurements. It could be specified by a user or automatically learned by the system using normal and defect images. The application knowledge 100 could be a typical image of the subject, a Computer Aided Design (CAD) model of the subject or entered by user through a user interface. The reference CAT model 106 consists of the basic structure and attribute values of an ideal subject and its tolerance ranges. A new image 108 is used to create 110 a result CAT model 112. The result CAT model 112 is the structure storing the measurement results of new image 108. The reference CAT model 106 and result CAT model 112 are compared 114 to determine the pass/fail status of the new image and/or measurement values 116 of image features of interest. In one embodiment of the invention, the comparison 114 is a simple check of the measurement results stored in result CAT model against the tolerance ranges stored in the reference CAT model. A new image 108 fails the inspection if any of its measurements of interest is outside the tolerance range. Otherwise, it passes the inspection.

III. Multi-Level CAT Model

Figure 2:
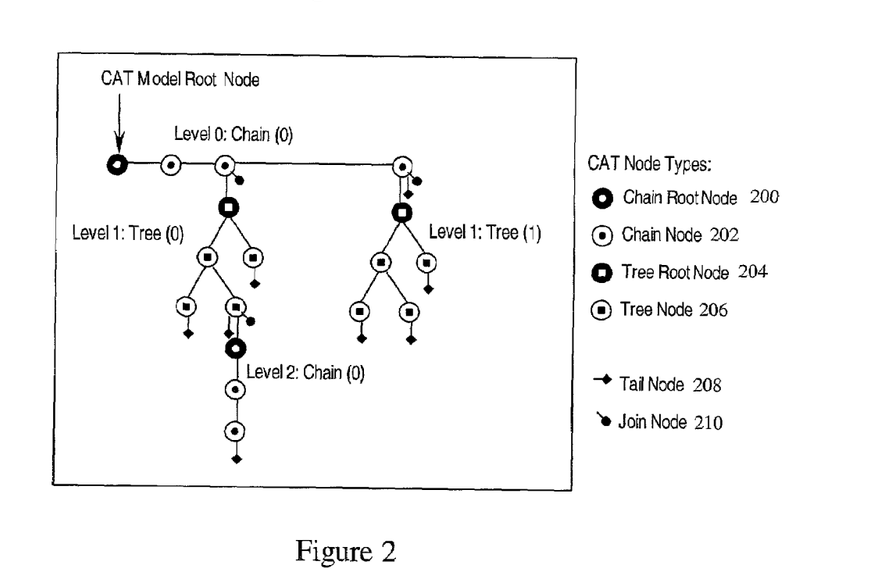
FIG. 2 shows a multilevel CAT model illustration.

A multi-level CAT model represents a subject by its components and their relations at multiple levels. The relations between components are represented as a chain or a tree link. In one embodiment of the invention, the CAT model is illustrated in FIG. 2.

III.1 CAT Model Elements

A CAT model contains at least one CAT chain or one CAT tree. CAT chain and CAT tree consists of CAT nodes.

A. CAT node

A CAT node is the basic unit of a CAT model. In one embodiment of the invention, there are four different types of CAT nodes: (1) chain root node 200, (2) chain node 202, (3) tree root node 204, and (4) tree node 206. A CAT node is a Join node 210, if it connects to a chain root node or a tree root node at lower level. A CAT node is a Tail node 208, if it is the last chain node or a terminal node of a tree in a given level. All CAT nodes, except the model root node, have one parent node. Each chain node has one child node at the same level, if it is not a tail node. Each tree node has one or more child nodes at the same level, if it is not tail node. Each CAT node has a "depth" attribute that represents the distance to its chain/tree root node. A root node has the depth of 0, and its children have the depth of 1, and so on.

B. CAT Chain and CAT Tree

A CAT chain contains at least one chain root node plus one or more chain nodes. A CAT tree contains at least one tree root node plus one or more tree nodes. Each CAT chain/tree has a "level" attribute that is the number of root nodes it has to pass through to reach the CAT model root node.

C. CAT Model

A CAT model contains at least one CAT chain or one CAT tree. Each CAT model has one model root node that is either a chain root node or a tree root node.

The CAT model of this invention offers a great flexibility in modeling an object. It has many advantages. Firstly, it allows the decomposition of a subject into components and relations. This allows a complicated object to be represented by a related set of simple components. Using simple components allows the pre-definition of the processing method, measurements and relations. For example, a bearing could be represented by multiple related simple circle or ring components.

The relationships between components of an object are expressed in a pair-wise fashion by chain or tree links in the CAT model. This allows a simplified representation of the complete relations. The advantage of the pair-wise relation of this invention allows efficient uses and handling of the relations. This is illustrated in FIG. 3.

Figure 3A:
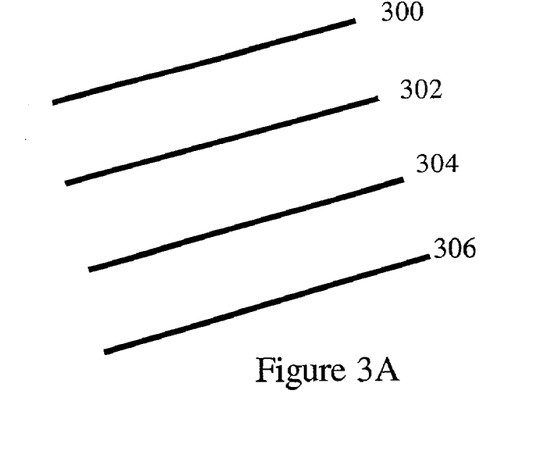
FIG. 3A shows an example of 4 parallel lines.
Figure 3B:
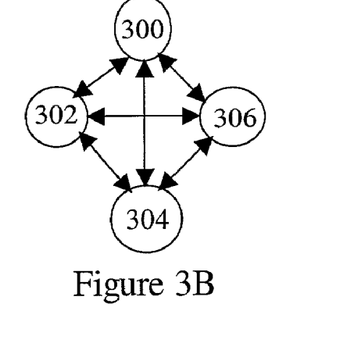
FIG. 3B shows a complete relational graph representation of the case in FIG. 3A.
Figure 3C:
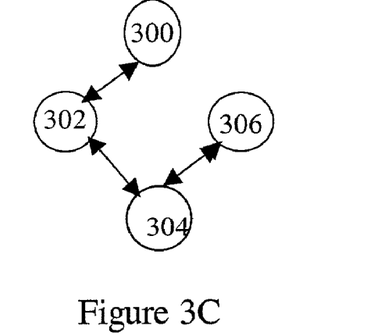

As shown in FIG. 3B, the complete relational graph representation of 4 parallel lines (see FIG. 3A) includes 6 relations. Line 300 is parallel (i.e. has a relationship) to line 302, to line 304, to line 306. Line 302 is also parallel to line 306 and line 304 is parallel to line 302 and to line 306. This is simplified in the CAT representation of this invention. Only 3 relations are required. Relation 1: line 300 is parallel to line 302. Relation 2: line 302 is parallel to line 304. Relation 3: line 304 is parallel to line 306. The complete relations can be inferred from this simplified chain of relations, but are not needed to represent the constraints. Simplifying the relations leads to simplified processing structures.

Figure 3D:
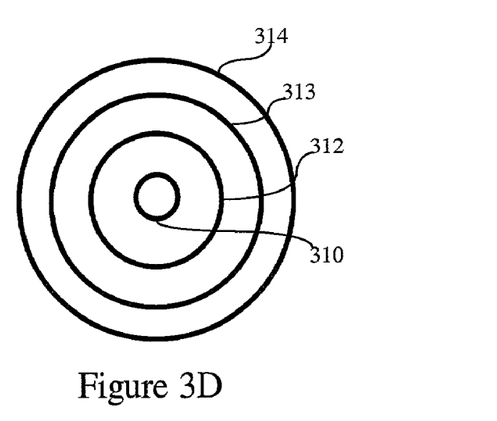
FIG. 3D shows an example of 4 concentric circles.
Figure 3E:
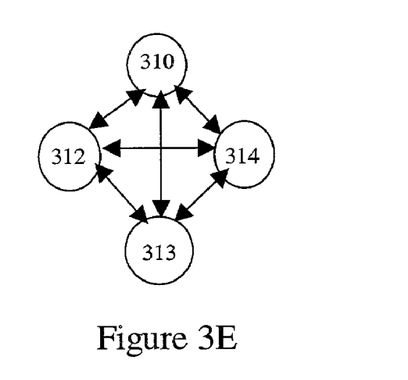
FIG. 3E shows a complete relational graph representation of the case in FIG. 3D.
Figure 3F:
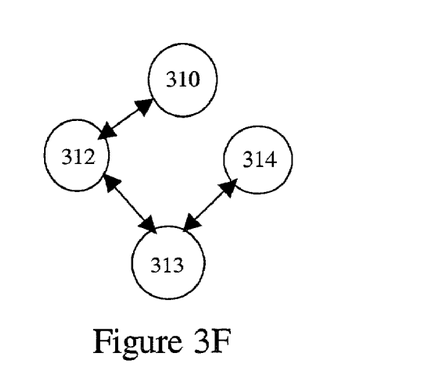
FIG. 3F shows a CAT representation of the relations of the case in FIG. 3D.

Similarly, a CAT representation (FIG. 3F) rather than a complete graph representation (FIG. 3E) can represent 4 concentric circles (FIG. 3D). Concentric circles 310, 312, 313, 314 have 6 concentricity relations shown in FIG. 3E. The CAT relations are shown in FIG. 3F wherein Circle 310 is concentric with circle 312. Circle 312 is concentric with 313 and circle 310. Circle 313 is concentric with 314 and concentric with 312. The efficiency improvement by CAT representation is significant for complicated objects that consist of many components and relations between components. In some cases, the complete relations may not be able to be inferred from the simplified relations yet the simplified representation can almost always encompass the important relations in practical applications.

III.2 CAT Component Elements

As described above, a CAT model contains one or more CAT nodes. Each CAT node contains one CAT component that is a part of the real object described by the CAT model. In the preferred embodiment of the invention, a CAT component is specified by its type and attributes as well as its relations.

III.2.1 CAT Component Type

CAT components include simple geometric entities such as ring, circle, arc, square, rectangle, line, cube, cylinder, cone, text, character, barcode, 2D symbology, arbitrary shape, or a group of components associated by its own CAT.

Those skilled in the art should recognize that other component types could be defined including three-dimensional or higher dimensional (such as including colors) entities or parts specific to an application such as different types of integrated circuit chips or different types of screws, etc.

III.2.2 CAT Component Features

Each component has associated attributes or features such as location (centroid, bounding box, etc.), rotation angle, scale, 1-dimensional measurement (width, length, radius, etc.), 2-dimensional measurement (area, aspect ratio, etc.), boundary points (link list, boundary point statistics), shape features (compactness, eccentricity, moments, Fourier descriptors, etc.), intensity features (mean density, standard deviation density, integrated density, etc.), texture features (co-occurrence statistics, run-length statistics, fractal dimension statistics, etc.), structure features for children components (number of components, average feature distance between components, etc.), text content or character value (for text or character components).

A reference CAT model 106 represents an ideal subject and its tolerances. Therefore, its feature attributes include not only the nominal values but also the tolerance ranges. Furthermore, it may store attributes such as a template image or valid character sets (for a character component) to facilitate pass/fail decision.

A result CAT model 112 represents an instance of the subject that is measured from the input image. Its feature attributes store the measured values. Additional attributes such as presence/absence of the component can also be included.

Those skilled in the art should recognize that other component features can be defined including color or three-dimensional features or features specific to an application.

III.2.3 CAT Component Relations

The relations between CAT nodes (such as CAT chains or CAT trees) can be represented by their links. The relations between CAT nodes are associated with the links. Since a CAT node can have only one parent yet it could have multiple children, the relations between nodes can be conveniently specified in the link between a CAT node to its parent node. In one embodiment of the invention, the relations include without limitation:

Distance: The distance between two components
Adjacency: such as touching, overlapping, etc.
InsideOutside: such as inside, outside, etc.
Parallelism
Perpendicularity
Concentricity
BetweenAngle: The angle between component major axes of a child node and its parent node.
AreaRatio: The ratio between component areas of the child node and its parent node.

LengthRatio: The ratio between component major axis lengths of the child node and its parent node.

Those skilled in the art should recognize that other component relations could also be defined including color, three-dimensional relations or parts specific relations.

III.3 Processing CAT Model

Figure 4:
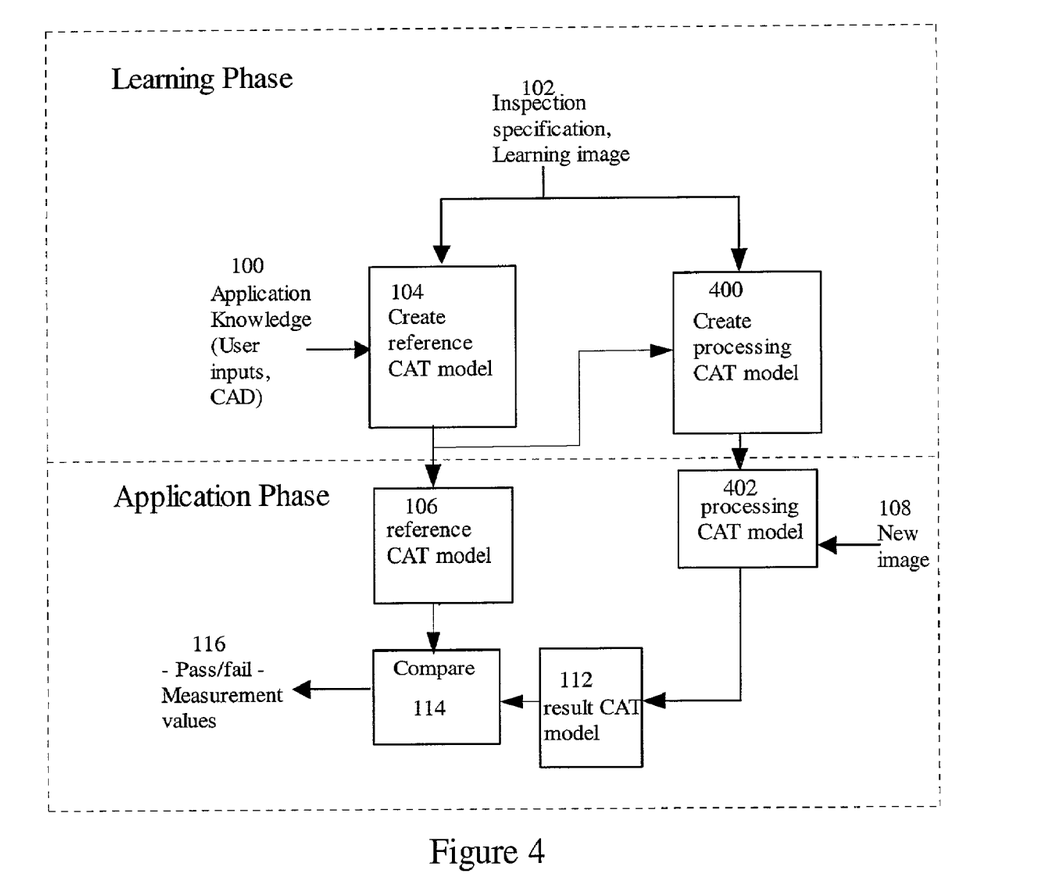
FIG. 4 shows an expanded application scenario of the CAT based ID system that includes a processing CAT model.

In another embodiment of the invention, a CAT model can also represent the image-based decision algorithm process; FIG. 4 illustrates the expanded application scenario of this invention. As shown in FIG. 1, a reference CAT model 104 is created using an inspection specification and/or learning image and/or application knowledge during the learning phase. The inspection specification 102 specifies the desired features for inspection and/or measurements. It could be specified by the user or automatically learned by the system after being shown normal and defected images. The application knowledge 100 could be a typical image of the subject, a CAD model of the subject or entered by a user through a user interface. The reference CAT model 106 consists of the basic structure and attribute values of an ideal subject and its tolerance ranges. A processing CAT model 402 is created 400 from the reference CAT model 106 and/or the inspection specification and/or learning image 102 in the learning phase. The processing CAT model 402 stores the processing algorithm and sequence that will be applied to a new image 108 to create 110 a result CAT model in the application phase.

A result CAT model 112 is used to represent the measurement results of a new image 108. The reference CAT model 106 and result CAT model 112 are compared 114 to determine the pass/fail status of the new image and/or measurement values of image features of interest. In one embodiment of the invention, the comparison is a simple check of the measurement results stored in the result CAT model 112 against the tolerance ranges stored in the reference CAT model 106. A new image fails the inspection 116 if any of its measurements of interest is outside the tolerance range. Otherwise, it passes the inspection.

The processing CAT model 402 includes detection methods associated with the CAT component type. For example, caliper edge detection can be associated with a CAT component in a processing CAT model for the detection of a regular shape CAT component such as ring, circle, arc, square, rectangle, and line, etc. A template matching method can be associated with a CAT component in a processing CAT model for the detection of an arbitrary shape CAT component.

In addition, measurement methods are associated with CAT component features. For example, rotation angle, scale, area, shape, density measurement functions can be defined in a processing CAT model to measure the desired features for the result CAT model. The processing CAT model 402 provides a framework to define and execute an image-based decision algorithm. This overcomes the prior-art difficulty of an inconsistent ad-hoc algorithm. It also provides a direct link between algorithm representation and subject and result model to facilitate easy comprehension, update, changes and debugging.

Those skilled in the art should recognize that other object modeling and representation methods can be used in the application scenario of this invention. For example, a Computer-aided Design (CAD) representation can be used instead of the CAT model.

This invention uses a common structure (either CAD or CAT or other model) for a reference model, a processing model and a result model to perform image based decision processing.

III.4 A Software Implementation

In one embodiment of the invention, the CAT model is implemented as software functions. The class diagram of the software implementation is shown in FIG. 5.

Figure 5:
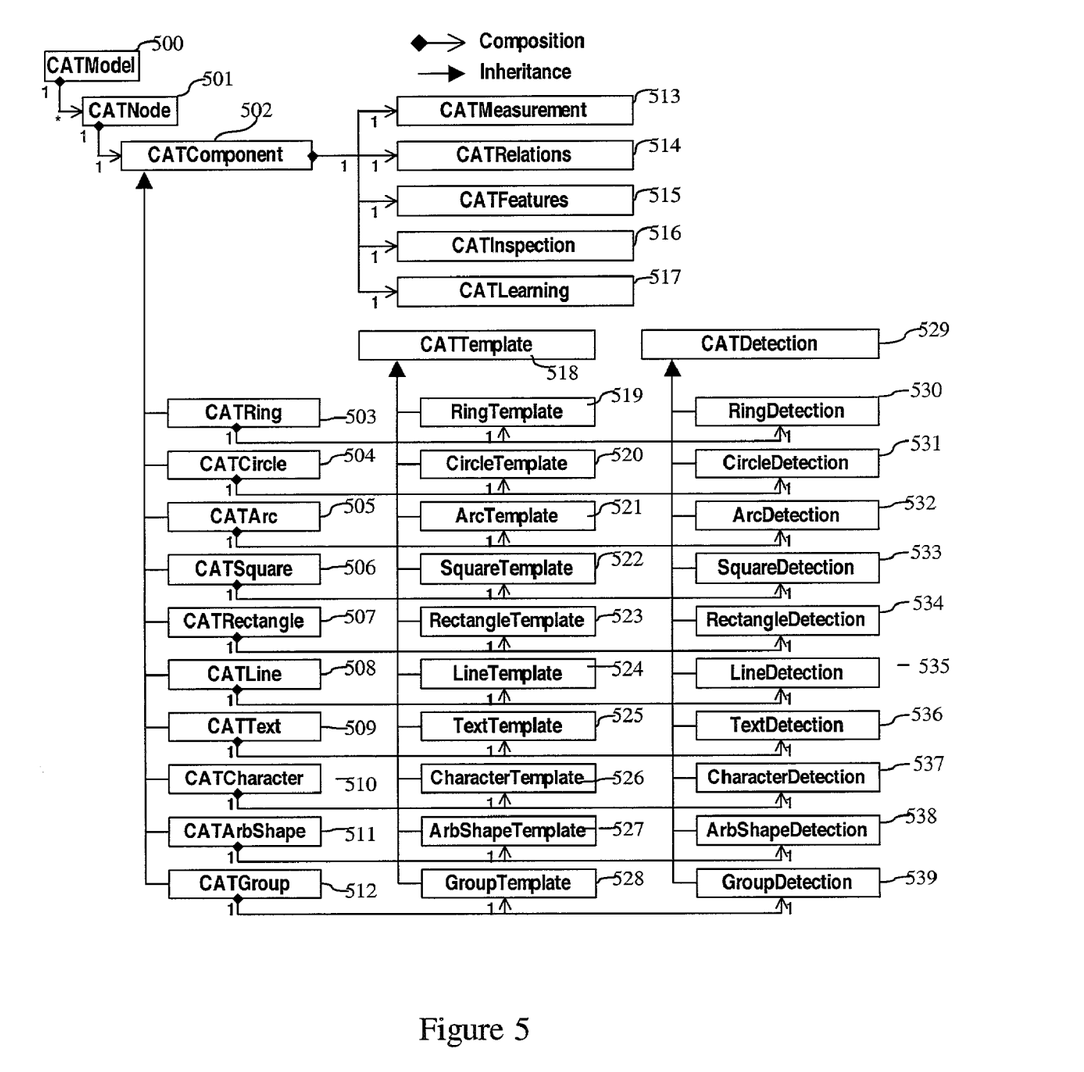
FIG. 5 shows the class diagram of a software implementation of the CAT model.

As shown in FIG. 5, a CATModel 500 contains one or more CAT nodes 501. Each CATNode 501 contains one CATComponent 502.

The CATComponent 502 types include CATRing 503, CATCircle 504, CATArc 505, CATSquare 506, CATRectangle 507, CATLine 508, CATText 509, CATCharacter 510, CATArbShape 511, and CATGroup 512. CATComponent types are a sub-class of the CATComponent 502 class.

Each CATComponet 502 contains an instance of CATMeasurement 513, CATRelations 514, CATFeatures 515, CATInspection 516, and CATLearning 517 classes. The CATTemplate 518 types include RingTemplate 519, CircleTemplate 520, ArcTemplate 521, SquareTemplate 522, RectangleTemplate 523, LineTemplate 524, TextTemplate 525, Character Template 526, ArbShapeTemplate 527, and GroupTemplate 528. Each CATTemplate type is a sub-class of the CATTemplate 518 class.

The CATDetection types 529 include RingDetection 530, CircleDetection 531, ArcDetection 532, SquareDetection 533, RectangleDetection 534, LineDetection 535, TextDetection 536, ArbShapeDetection 538, and GroupDetection 539. CATDetection types are sub-class of the CATDetection 529 class.

III.4.1 CATModel Class

CATModel class 500 represents a Chain-And-Tree (CAT) model.

Attributes:
    ModelRootNode: CATNode
        The root node of the CAT model.
    originalImage: Image
        The original image that has the picture of the whole object of interest.
    numLevels: int
        Number of level of chain/tree in the CAT model.

Operations:
    createCATModel(CHAIN/TREE, CATComponent)
        Create the CAT model and add the model root node.
    addChainRootNode(Level, Chain/Tree Index, Node Index, CATComponent): bool
        Add a chain root node into the CAT model. Level is the level of the parent node. Chain/Tree Index is the chain/tree index of the parent node. Node Index is the node index of the parent node. The parent node becomes a Join Node after the chain root node is created.
    addChainChildNode(Level, Chain/Tree Index, Node Index, CATComponent): bool
        Add a chain node into the CAT model.
    addTreeRootNode(Level, Chain/Tree Index, Node Index, CATComponent): bool
        Add a tree root node into the CAT model. The parent node becomes a Join Node after the tree root node is created.
    addTreeChildNode(Level, Chain/Tree Index, Node Index, CATComponent): bool
        Add a tree node into the CAT model.
    plotCATModelDiagram( ): bool
        Plot the CAT model diagram.

detectCATModel( ): bool
    Detect the CAT model components in a given image.
displayDetectedCATModel( ): bool
    Display detected CAT model components.
extractFeatures( ): bool
    Calculate features of CATComponents of all or some CAT nodes.
getRelations( ): bool
    Calculate the relationship features among CAT components of a parent node and its child nodes.
performInspection( ): bool
    Checking component attributes against given tolerances.
performPatternMatching( ): bool
    Perform pattern matching to find a certain component.
performFeatureLearning( ): bool
    Perform feature learning.
performToleranceLearning( ): bool
    Perform tolerance learning.
performOnlineLearning( ): bool
    Perform online learning.
performLearningAcceleration( ): bool
    Perform learning acceleration.

III.4.2 CATNode Class

CATNode class 501 represents an individual node of a CAT model 500. Each CATNode linked to a CATComponent that is a part of the real object described by the CAT model.
    Attributes:
        nodeClass: int
            NORMAL_NODE=0
            ROOT_NODE=1
            TAIL_NODE=2 (default)
        nodeType: int
            CHAIN_NODE=0
            TREE_NODE=1
        isJoinNode: bool
            Join node=true
            Non-join node=false
        linkedRootNode: CATNode
            Linked root node. For Join node only.
        parentNode: CATNode
            The parent node.
        childNodes: List
            A list of child nodes.
        similarChildren: bool
            Children are alike=true
            Children are not alike=false
        level: int
            The level of the CAT tree/chain the node belongs to.
        CATIndex: int
            The index of a CAT tree/chain in the level it belongs to.
        nodeIndex: int
            Index of the node in a CAT chain/tree.
        depth: int
            The depth of the node inside a CAT chain/tree. It is the unit distance from a node to its root node.
        maxDepth: int
            Maximum depth of the chain/tree. For root node only.
        numCATNodes: int
            Number of CAT nodes in a chain/tree. For tree root node only.
        catComponent: CATComponent
            Reference to a CATComponent.
    Operations:
        plotCATNode( ): bool
            Plot the CAT node.

III.4.3 CATComponent Class

CATComponent class 502 represents a physical component that is a part of the real object described by the CAT model.
    Attributes:
        componentType: int
            Ring=1
            Circle=2
            Arc=3
            Square=4
            Rectangle=5
            Line=6
            Text=7
            Character=8
            Arbitrary shape=9
            Group=10
        catMeasurement: CATMeasurement
        catRelations: CATRelations
        catFeatures: CATFeatures
        catInspection: CATInspection
        catLearning: CATLearning
    Operations:
        virtual detectCompnent( ): bool
            Detect the component on a given image.
        virtual displayDetectedComponent( ): bool
            Display detected component.
        performMeasurement( ): bool
            Perform basic measurements.
        extractFeatures( ): bool
            Calculate features of CATComponent.
        getRelations( ): bool
            Calculate the relationship features between parent node and child nodes or among child nodes.
        performInspection( ): bool
            Checking measured component features against given tolerances
        performPatternMatching( ): bool
            Perform pattern matching to find the component.
        performFeatureLearning( ): bool
            Perform feature learning.
        performToleranceLearning( ): bool
            Perform tolerance learning.
        performOnlineLearning( ): bool
            Perform online learning.
        performLearningAcceleration( ): bool
            Perform learning acceleration.

III.4.4 CATTemplate Class

CATTemplate class 518 defines the expected look, locations, and searching ranges for the component detection or pattern matching.
    Attributes:
        templateImage: Image
            Template image to be used for detection or pattern matching.
        multiResolutionTemplateImage: Image
            Multi-resolution template image to be used for detection or pattern matching.
        searchingROI: ROI The region to find the component.
startingLocations: List of points
　The locations to start component searching.
startingMask: Image
　A mask indicates where to start component searching.
Operations:
　setTemplateImage( ): bool
　　To set up the template image.
　setSearchingROI( ): bool
　　To set up region for component searching.
　setStartingLocations( ): bool
　　To set up locations for component searching.
　setStartingMask( ): bool
　　To set up mask for component searching.

III.4.5 CATDetection Class

CATDetection class 529 is for component detection or pattern matching using information provided by CATTemplate 518.
　Attributes:
　　detectedMask: Image
　　　A binary image that represents the detected component.
　　scale: float
　　　The ratio between detected component size and the expected size.
　　rotationAnlge: float
　　　The angle between detected component angle and the expected angle.
　Operations:
　　performDetection( ): bool
　　　Detect the component.
　　patternMatching( ): bool
　　　Perform pattern matching to find the component.

III.4.6 CATMeasurement Class

CATMeasurement class 513 is for calculating and holding basic features of a component after the detection is done.
　Attributes:
　　area int
　　　Component area in number of pixels
　　boundingBox: ROI
　　　The bounding box surrounding the component.
　　center: Point
　　　Component center—center of the bounding box.
　　centroid: Point
　　　Centroid of the component.
　　occlusion: bool
　　　View of the object is blocked by other objects=true
　　　Otherwise=false
　　width/height: float
　　　For rectangular component.
　　length: float
　　　For line component.
　　innerRadius/outerRadius: float
　　　For circle, ring, and arc component.
　　numCharacters/validCharacterSets: int
　　　For text component.
　　boundaryPointsStatistics: list
　　　Boundary points statistics
　Operations:
　　getBasicMeasurements( ): bool
　　　Cacluates area, boundingBox, center, and centroid of the component.
　　getWidthAndHeigh( ): bool
　　　Calculate width and height of a rectangular component.
　　getLineLength( ): bool
　　　Calculate the length of a line component.
　　getRadius( ): bool
　　　Calculate inner/outer radius of a circle, ring, or arc component.
　　countNumberOfCharacters( ): bool
　　　Count the number of characters in the text component.

III.4.7 CATRelations Class

CATRelation class 514 is for calculating and holding relationship features that represent relations between components of a child node and its parent node, and relations among components of child nodes.
　Attributes:
　　distance: int
　　　The distance between two components' centroids of the child node and its parent node.
　　adjacency: int
　　　Untouched=0
　　　Touching=1
　　　Overlapping=2
　　insideOutside: int
　　　NotApplied=0
　　　Inside=1
　　　Outside=2
　　isParallel: bool
　　　Parallel=true
　　　Not parallel=false
　　isPerpendicular: bool
　　　Perpendicular=true
　　　Not perpendicular=false
　　isConcentric: bool
　　　Concentric=true
　　　Not concentric=false
　　betweenAngle: float
　　　The angle between component major axes of child node and its parent node.
　　areaRatio: float
　　　Ratio between component areas of the child node and its parent node.
　　lengthRatio: float
　　　Ratio between component major axis lengths of the child node and its parent node.
　　childrenStatusList: List of ints
　　　Types of status: normal=0, broken=1, missing=2.
　　betweenDistanceList: List of floats
　　　Distance between centroids of two neighboring child component pair.
　Operations:
　　getReloationWithParent( ): bool
　　　Calculate all relationship features between components of a child node and its parent node.
　　getReloationAmongChildren( ): bool
　　　Calculate all relationship features among components of child nodes.

III.4.8 CATFeatures Class

CATFeatures class 515 is for calculating and holding components features.
　Attributes:
　　orginalImage: Image
　　　The original image.
　　componentMask: Image The binary component mask (a result of detection).
referenceImage: Image
   A reference image for feature calculation.
selectedFeatures: List of strings
   A list of selected features.
featureValues: List of floats
   Feature values of the selected features.
Operations:
   calculateAllFeatures( ): bool
      Calculate all selected features.
   saveFeatureValuesToFile( ): bool
      Save all feature values to a file.
   displayFeatureValues( ): bool
      Display feature values.

III.4.9 CATInspection Class

CATInspection class 516 is for inspecting a component by comparing selected component features against their tolerances.
   Attributes:
      featureList: List of String
         List of selected features.
      featureValues: List of floats
         Feature values of the selected features.
      featureTolerances: List of Tolerances
         List of tolerances for selected featrues.
   Operations:
      performInspection( ): bool
         Perform the inpsection.
      setTolerances( ): bool
         Set up tolerances for selected featrues.

III.4.10 CATLearning Class

CATLearning class 517 is for feature learning, tolerance learning, online learning, and learning acceleration.
   Attributes:
      featureValues: List of floats
         List of feature values.
      scores: List of floats
         List of scores.
      thresholds: List of floats
         List of thresholds.
   Operations:
      getCalculateScores( ): bool
         Calculate scores.
      performFeatureLearning( ): bool
         Perform feature learning.
      performToleranceLearning( ): bool
         Perform tolerance learning.
      performOnlineLearning( ): bool
         Perform online learning.
      performLearningAcceleration( ): bool
         Perform learning acceleration.

Those skilled in the art should recognize that other software class definitions or different software, firmware, or hardware implementations of the CAT model could be used without deviating from the essence of this invention.

IV. A CAT Model Example

Figure 6A:
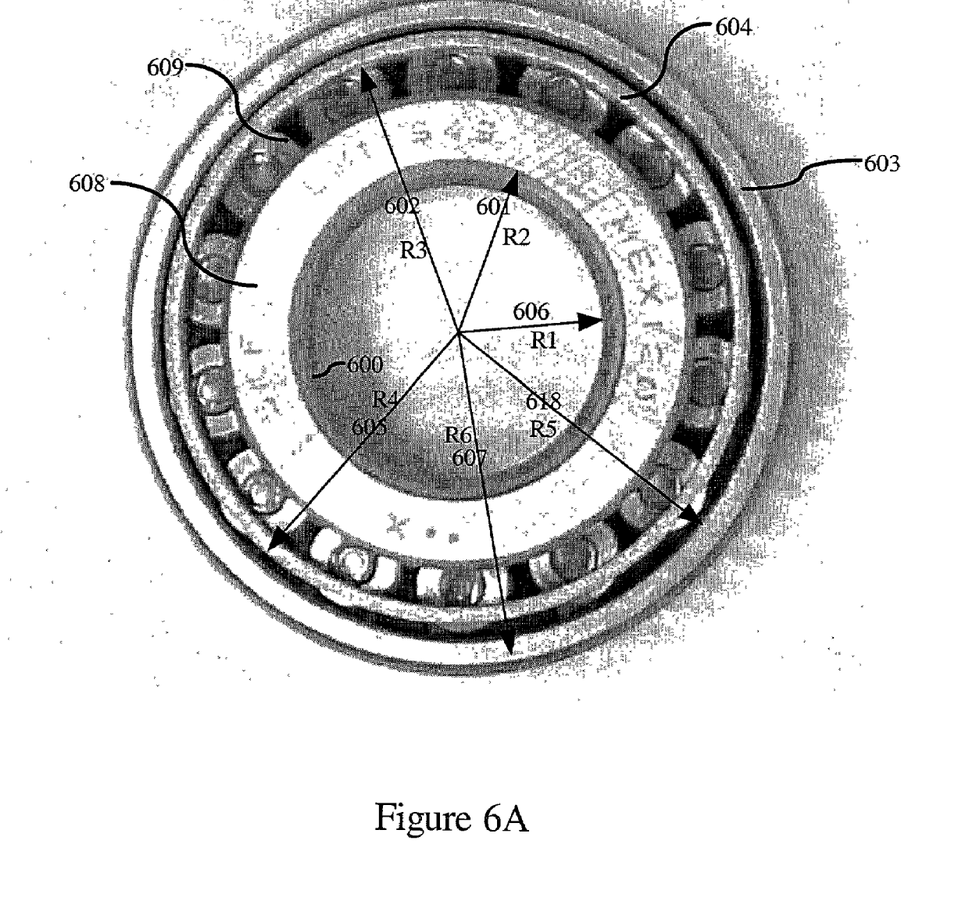
FIG. 6A shows a bearing image.

A CAT model can be generated by users manually or generated from CAD (Computer-Aided Design) data automatically. The significant components of a subject are assigned a CAT node and the relations between components are encoded through chain or tree links. FIG. 6A shows a bearing image and FIG. 6B shows a CAT mapping of the image in FIG. 6A.

Figure 6B:
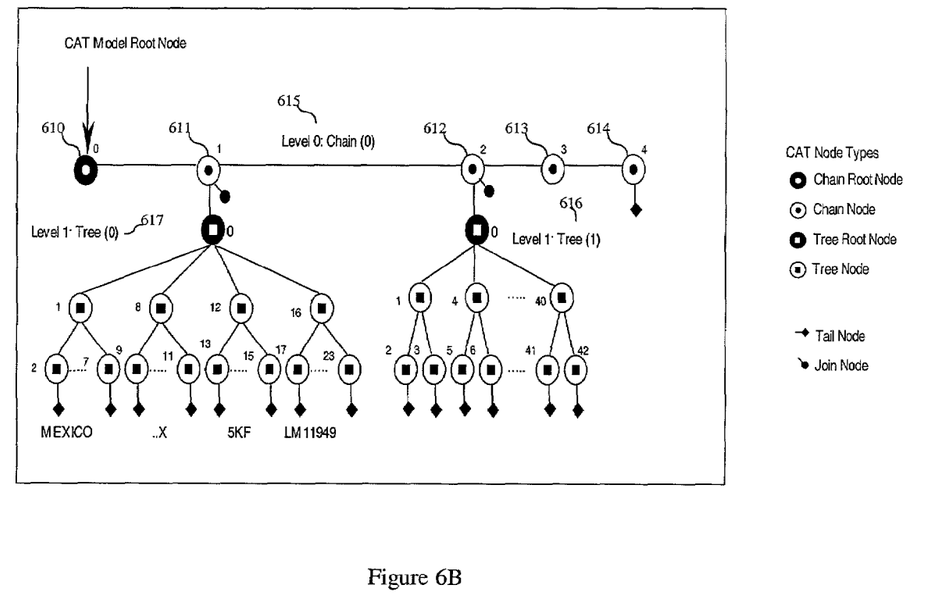
FIG. 6B shows a CAT mapping of the image in FIG. 6A.

As shown in FIGS. 6A and 6B, CAT node 0 610 is the model root node that corresponds to the dark ring of the inner race 600. CAT node 0 610, node 1 611, node 2 612, node 3 613 and node 4 614 are modeled by chain (0) at level 0 615. In this chain, node 1 611 is the bright region of inner race 608; node 2 612 is the ring shaped region that covers the bearings 609; node 3 613 is the retainer 604; and node 4 614 is the outer race 603. Node 1 at Level 0: Chain(0) 617 contains the part labels that are separated into 4 text regions modeled as tree nodes (nodes 1, node 8, node 12 and node 16 at Level 1: Tree(0) 617). Each text region further consists of characters that are represented by deeper tree nodes (nodes 2–7, nodes 9–11, nodes 13–15, and nodes 17–23).

Node 2 612 at Level 0: Chain(0) consists of 14 bearings. The bearings are modeled as tree nodes at Level 1: Tree(1) 616 (nodes 1, 4, 7, 10, . . . , 40). Each bearing consists of two elements. They are again modeled as deeper tree nodes (nodes 2, 3, 5, 6, . . . 41, 42).

IV.1 Inspection Specification and Associated Components and Features

The inspection specification and associated components and features in this example is:
1. Find the center position of the bearing so that no fixture is required. The associated component and feature is Node (0,0,0): centroid.
2. Measure radii: R1 600, R2 601, R3 602 and R4 605. The associated components and features are Node (0,0,0): inner radius; Node (0,0,1): outer radius; Node (0,0,3): inner radius and Node (0,0,3): outer radius.
3. Confirm no defects in the inner race and retainer. That is, measure inner race eccentricity (between the boundary points and center radius deviation). The associated component and feature is Node (0,0,0): inner boundary point-to-center statistics.
4. Count the number of bearings. The associated component and feature is Node (1,1,0): children count.
5. Inspect bearings for missing or gross defects and inter-bearing spacing. The associated components and features are Node (1,1,0): children centroid sequential spacing; Node (1,1,X+1): area; Node (1,1,X+2): area. For X=1+3Y where Y=0 to 13.
6. Measure radii R5 618 and R6 607 of outer race. The associated component and feature is Node (0,0,4): inner radius and Node (0,0,4): outer radius.
7. Confirm no defects in the outer race. That is, measure outer race eccentricity (between the boundary points and center radius deviation). The associated component and feature is Node (0,0,4): inner boundary point-to-center statistics.
8. Part ID: The associated components and features are Node (1,0,[2,3,4,5,6,7]): character; Node (1,0,[9,10,11]): character; Node (1,0,[13,14,15]): character; Node (1,0,[17,18,19,20,21,22,23]): character.

IV.2 Relations Between Linked Components

The relations between linked components that could enhance the CATID is defined as follows:
1. Node (0,0,1) vs. Node (0,0,0): concentricity
2. Node (0,0,2) vs. Node (0,0,1): concentricity
3. Node (0,0,3) vs. Node (0,0,2): concentricity
4. Node (0,0,4) vs. Node (0,0,3): enclosing
5. Node (1,0,[1,8,12,16]) vs. Node (1, 0, 0): baseline concentricity IV.3 CAT Model Creation In software implementation embodiment of the invention, the CAT model of the example subject is created by the following function calls.

Create Level 0 Chain 0:
  CreatCATModel(CHAIN,2D Ring)=>(0,0,0) created
  AddChainChildNode(Level=0, Chain/Tree Index=0, Node Index=0,2D Ring)=>(0,0,1) created
  AddChainChildNode(0,0,1,2D Ring)=>(0,0,2) created
  AddChainChildNode(0,0,2,2D Ring)=>(0,0,3) created
  AddChainChildNode(0,0,3,2D Ring)=>(0,0,4) created
Create Level 1 Tree 0:
  AddTreeRootNode(0,0,1,2D Ring)=>(0,0,1) becomes Join, (1,0,0) created
  AddTreeChildNode(1,0,0,2D Arc)=>(1,0,1) created
  AddTreeChildNode(1,0,1,Character)=>(1,0,2) created (M)
  AddTreeChildNode(1,0,1,Character)=>(1,0,3) created (E)
  AddTreeChildNode(1,0,1,Character)=>(1,0,4) created (X)
  AddTreeChildNode(1,0,1,Character)=>(1,0,5) created (I)
  AddTreeChildNode(1,0,1,Character)=>(1,0,6) created (C)
  AddTreeChildNode(1,0,1,Character)=>(1,0,7) created (O)
  AddTreeChildNode(1,0,0,2D Arc)=>(1,0,8) created
  AddTreeChildNode(1,0,8,Character)=>(1,0,9) created (.)
  AddTreeChildNode(1,0,8,Character)=>(1,0,10) created (.)
  AddTreeChildNode(1,0,8,Character)=>(1,0,11) created (X)
  AddTreeChildNode(1,0,0,2D Arc)=>(1,0,12) created
  AddTreeChildNode(1,0,12,Character)=>(1,0,13) created (5)
  AddTreeChildNode(1,0,12,Character)=>(1,0,14) created (K)
  AddTreeChildNode(1,0,12,Character)=>(1,0,15) created (F)
  AddTreeChildNode(1,0,0,2D Arc)=>(1,0,16) created
  AddTreeChildNode(1,0,16,Character)=>(1,0,17) created (L)
  AddTreeChildNode(1,0,16,Character)=>(1,0,18) created (M)
  AddTreeChildNode(1,0,16,Character)=>(1,0,19) created (1)
  AddTreeChildNode(1,0,16,Character)=>(1,0,20) created (1)
  AddTreeChildNode(1,0,16,Character)=>(1,0,21) created (9)
  AddTreeChildNode(1,0,16,Character)=>(1,0,22) created (4)
  AddTreeChildNode(1,0,16,Character)=>(1,0,23) created (9)
Create Level 1 Tree 1:
  AddTreeRootNode(0,0,2,2D Ring)=>(0,0,2) becomes Join, (1,1,0) created
  AddTreeChildNode(1,1,0,Group)=>(1,1,1) created
  AddTreeChildNode(1,1,1,2D Circle)=>(1,1,2) created
  AddTreeChildNode(1,1,1,2D Ring)=>(1,1,3) created
  AddTreeChildNode(1,1,0,Group)=>(1,1,4) created
  AddTreeChildNode(1,1,4,2D Circle)=>(1,1,5) created
  AddTreeChildNode(1,1,4,2D Ring)=>(1,1,6) created
  . . .
  AddTreeChildNode(1,1,0,Group)=>(1,1,40) created
  AddTreeChildNode(1,1,40,2D Circle)=>(1,1,41) created
  AddTreeChildNode(1,1,40,2D Ring)=>(1, 1,42) created IV.4 CAT Model Attributes In software implementation embodiment of the invention, the CAT model attributes are
  ModelRootNode=(0,0,0)
  numLevels=2 and the individual node attributes for the example subject are
  Level 0 Chain 0:
    Node (0,0,0)
      nodeClass=ROOT_NODE
      nodeType=CHAIN_NODE
      isJoinNode=false
      linkedRootNode=NULL
      parentNode=NULL
      childnodes=(0,0,1)
      depth=0
      maxDepth=4
      numCATNodes=5
      catComponent=CATRing
        multiResolutionTemplateImage:Image
        centroid:Point
        innerRadius:float
        outerRadius:float
        boundaryPointsStatistics:BoundaryPointsStatistics
    Node (0,0,1)
      nodeClass=NORMAL_NODE
      nodeType=CHAIN_NODE
      isJoinNode=true
      linkedRootNode=(1,0,0)
      parentNode=(0,0,0)
    Geometric relations
      Concentricity
    Adjacency
      Inner touch outer boundary
      childNodes=(0,0,2)
      depth=1
      catComponent=CATRing
        outerRadius:float
    Node (0,0,2)
      nodeClass=NORMAL_NODE
      nodeType=CHAIN_NODE
      isJoinNode=true
      linkedRootNode=(1,1,0)
      parentNode=(0,0,1)
    Geometric relations
      Concentricity
    Adjacency
      Inner touch outer boundary
      childNodes=(0,0,3)
      depth=2
      catComponent=CATRing
    Node (0,0,3)
      nodeClass=NORMAL_NODE
      nodeType=CHAIN_NODE
      isJoinNode=false
      linkedRootNode=NULL
      parentNode=(0,0,2)
    Geometric relations
      Concentricity
    Adjacency
      Inner touch outer boundary
      childNodes=(0,0,4)

```
            depth=3
            catComponent=CATRing
        Node (0,0,4)
            nodeClass=TAIL_NODE
            nodeType=CHAIN_NODE
            isJoinNode=false
            linkedRootNode=NULL
            parentNode=(0,0,3)
            Geometric relations
                Enclosing
            childNodes=NULL
            depth=4
            catComponent=CATRing
                innerRadius:float
                outerRadius:float
                boundaryPointsStatistics:BoundaryPointsStatistics
Level 1 Tree 0:
    Node (1,0,0)
        nodeClass=ROOT_NODE
        nodeType=TREE_NODE
        isJoinNode=false
        linkedRootNode=NULL
        parentNode=(0,0,1)
        childNodes=(1,0,1) (1,0,8) (1,0,12) (1,0,16)
        depth=0
        maxDepth=2
        numCATNodes=24
        catComponent=CATRing
    Node (1,0,1)
        nodeClass=NORMAL_NODE
        nodeType=TREE_NODE
        isJoinNode=false
        linkedRootNode=NULL
        parentNode=(1,0,0)
        Geometric relations
            Concentricity
        childNodes=(1,0,2) (1,0,3) (1,0,4) (1,0,5) (1,0,6) (1,0,7)
        depth=1
        catComponent=CATArc
            children centroid sequential spacing
    Node (1,0,[2,3,4,5,6,7])
        nodeClass=TAIL_NODE
        nodeType=TREE_NODE
        isJoinNode=false
        linkedRootNode=NULL
        parentNode=(1,0,1)
        childNodes=NULL
        depth=2
        catComponent=CATCharacter
            character:char
            characterTemplateImage:Image
    Node (1,0,8)
        nodeClass=NORMAL_NODE
        nodeType=TREE_NODE
        isJoinNode=false
        linkedRootNode=NULL
        parentNode=(1,0,0)
        Geometric relations
            Concentricity
        childNodes=(1,0,9) (1,0,10) (1,0,11)
        depth=1
        catComponent=CATArc
            children centroid sequential spacing
    Node (1,0,[9,10,11])
        nodeClass=TAIL_NODE
        nodeType=TREE_NODE
        isJoinNode=false
        linkedRootNode=NULL
        parentNode=(1,0,8)
        childNodes=NULL
        depth=2
        catComponent=CATCharacter
            character:char
            characterTemplateImage:Image
    Node (1,0,12)
        nodeClass=NORMAL_NODE
        nodeType=TREE_NODE
        isJoinNode=false
        linkedRootNode=NULL
        parentNode=(1,0,0)
        Geometric relations
            Concentricity
        childNodes=(1,0,13) (1,0,14) (1,0,15)
        depth=1
        catComponent=CATArc
            children centroid sequential spacing
    Node (1,0,[13,14,15])
        nodeClass=TAIL_NODE
        nodeType=TREE_NODE
        isJoinNode=false
        linkedRootNode=NULL
        parentNode=(1,0,12)
        child Nodes=NULL
        depth=2
        catComponent=CATCharacter
            character:char
            characterTemplateImage:Image
    Node (1,0,16)
        nodeClass=NORMAL_NODE
        nodeType=TREE_NODE
        isJoinNode=false
        linkedRootNode=NULL
        parentNode=(1,0,0)
        Geometric relations
            Concentricity
        childNodes=(1,0,17) (1,0,18) (1,0,19) (1,0,20) (1,0,21) (1,0,22) (1,0,23)
        depth=1
        catComponent=CATArc
            children centroid sequential spacing
    Node (1,0,[17,18,19, 20,21,22,23])
        nodeClass=TAIL_NODE
        nodeType=TREE_NODE
        isJoinNode=false
        linkedRootNode=NULL
        parentNode=(1,0,16)
        childNodes=NULL
        depth=2
        catComponent=CATCharacter
            character:char
            characterTemplateImage:Image
Level 1 Tree 1:
    Node (1,1,0)
        nodeClass=ROOT_NODE
        nodeType=TREE_NODE
        isJoinNode=false
        linkedRootNode=NULL
        parentNode=(0,0,2)
```

```
childNodes=(1,1,1) (1,1,4) (1,1,7) (1,1,10) (1,1,13)
    (1,1,16) (1,1,19) (1,1,22) (1,1,25) (1,1,28) (1,1,31)
    (1,1,34) (1,1,37) (1,1,40)
depth=0
maxDepth=2
numCATNodes=43
catComponent=CATRing
    children centroid sequential spacing
    children count
Node (1,1,X) for X=1+3Y where Y=0 to 13
    nodeClass=NORMAL_NODE
    nodeType=TREE_NODE
    isJoinNode=false
    linkedRootNode=NULL
    parentNode=(1,1,0)
    childNodes=(1,1,2) (1,1,3)
    depth=1
    catComponent=CATRroup
        centroid:Point
        templage:Image
Node (1,1,X+1)
    nodeClass=TAIL_NODE
    nodeType=TREE_NODE
    isJoinNode=false
    linkedRootNode=NULL
    parentNode=(1,1,1)
    childNodes=NULL
    depth=2
    catComponent=CATCircle
        area:int
        templage:Image
Node (1,1,X+2)
    nodeClass=TAIL_NODE
    nodeType=TREE_NODE
    isJoinNode=false
    linkedRootNode=NULL
    parentNode=(1,1,1)
    childNodes=NULL
    depth=2
    catComponent=CATRing
        area:int
```

Those skilled in the art should recognize that other means of CAT model mapping and features and relation specifications could be used without deviating from the essence of this invention.

The invention has been described herein in considerable detail in order to comply with the Patent Statutes and to provide those skilled in the art with the information needed to apply the novel principles and to construct and use such specialized components and structures as are required. However, it is to be understood that the inventions can be carried out by specifically different equipment and devices, and that various modifications, both as to the method detail and organization procedures, can be accomplished without departing from the scope of the invention itself.

What is claimed is:

1. An image-based decision method using a multilevel Chain-And-Tree model comprises the following steps:
    (a) Input at least one reference multilevel CAT model basis of a subject selected from the set consisting of inspection specification, learning image, and application knowledge;
    (b) Create a multilevel reference CAT model using at least one reference CAT model basis wherein the subject is represented by its components of geometric entities and their relations at multiple levels and the relations between components are represented as a chain or a tree link;
    (c) Input a new image;
    (d) Create a multilevel result CAT model having the same structure as the multilevel reference CAT model storing the measurement results of new image within the multilevel structure;
    (e) Compare the multilevel reference CAT model and multilevel result CAT model to output a measurement result.

2. The method of claim 1 wherein the multilevel reference CAT model consists of the basic multilevel structure and attribute values of an ideal subject and its tolerance ranges wherein the attribute values include a level attribute, depth attribute, and component features.

3. The method of claim 1 wherein the multilevel CAT model contains at least one CAT chain wherein the relations between CAT chain nodes can be specified and wherein the relations are selected from the set consisting of Distance, Adjacency, InsideOutside, Parallelism, Perpendicularity, Concentricity, BetweenAngle, AreaRatio, and LengthRatio.

4. The method of claim 1 wherein the multilevel CAT model contains at least one CAT tree wherein the relations between CAT tree nodes can be specified and wherein the relations are selected from the set consisting of Distance, Adjacency, InsideOutside, Parallelism, Perpendicularity, Concentricity, BetweenAngle, AreaRatio, and LengthRatio.

5. The method of claim 1 wherein the multilevel CAT model contains at least one CAT node selected from the set consisting of chain root node, chain node, tree root node, and tree node.

6. An image-based decision method using a multilevel Chain-And-Tree model comprises the following steps:
    (a) Input inspection specification;
    (b) Input at least one learning image;
    (c) Create a multilevel reference CAT model using the inputs wherein the subject is represented by its components of geometric entities and their relations at multiple levels and the relations between components are represented as a chain or a tree link;
    (d) Create a multilevel processing CAT model using the inputs and the multilevel reference CAT model having the same structure as the multilevel reference CAT model storing the processing algorithm and sequence within the multilevel structure;
    (e) Input a new image;
    (f) Create a multilevel result CAT model using the processing CAT model and the new image having the same structure as the multilevel reference CAT model storing the measurement results of new image within the structure;
    (g) Compare the multilevel reference CAT model and multilevel result CAT model to output at least one result.

7. The method of claim 6 wherein the multilevel reference CAT model consists of the basic multilevel structure and attribute values of an ideal subject wherein the attribute values include a level attribute, a depth attribute, and component features.

8. The method of claim 6 wherein the multilevel processing CAT model includes detection methods associated with the CAT component type for the detection of the CAT component.

9. The method of claim 6 wherein the CAT model contains at least one CAT chain wherein the relations between CAT chain nodes can be specified and wherein the relations are selected from the set consisting of Distance, Adjacency, InsideOutside, Parallelism, Perpendicularity, Concentricity, BetweenAngle, AreaRatio, and LengthRatio.

10. The method of claim 6 wherein the CAT model contains at least one CAT tree wherein the relations between CAT tree nodes can be specified and wherein the relations are selected from the set consisting of Distance, Adjacency, InsideOutside, Parallelism, Perpendicularity, Concentricity, BetweenAngle, AreaRatio, and LengthRatio.

11. The method of claim 6 wherein the CAT model contains at least one CAT node selected from the set consisting of chain root node, chain node, tree root node, and tree node.

* * * * *